June 24, 1930.                    D. SOLODAR                    1,767,712
                              ADVERTISING DEVICE
                            Filed March 28, 1929           5 Sheets-Sheet 1
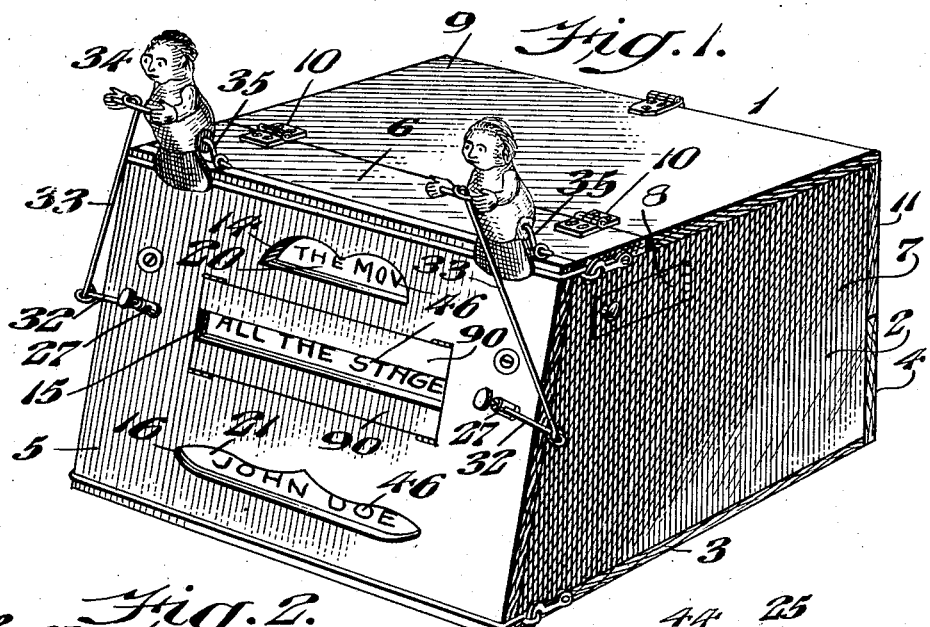
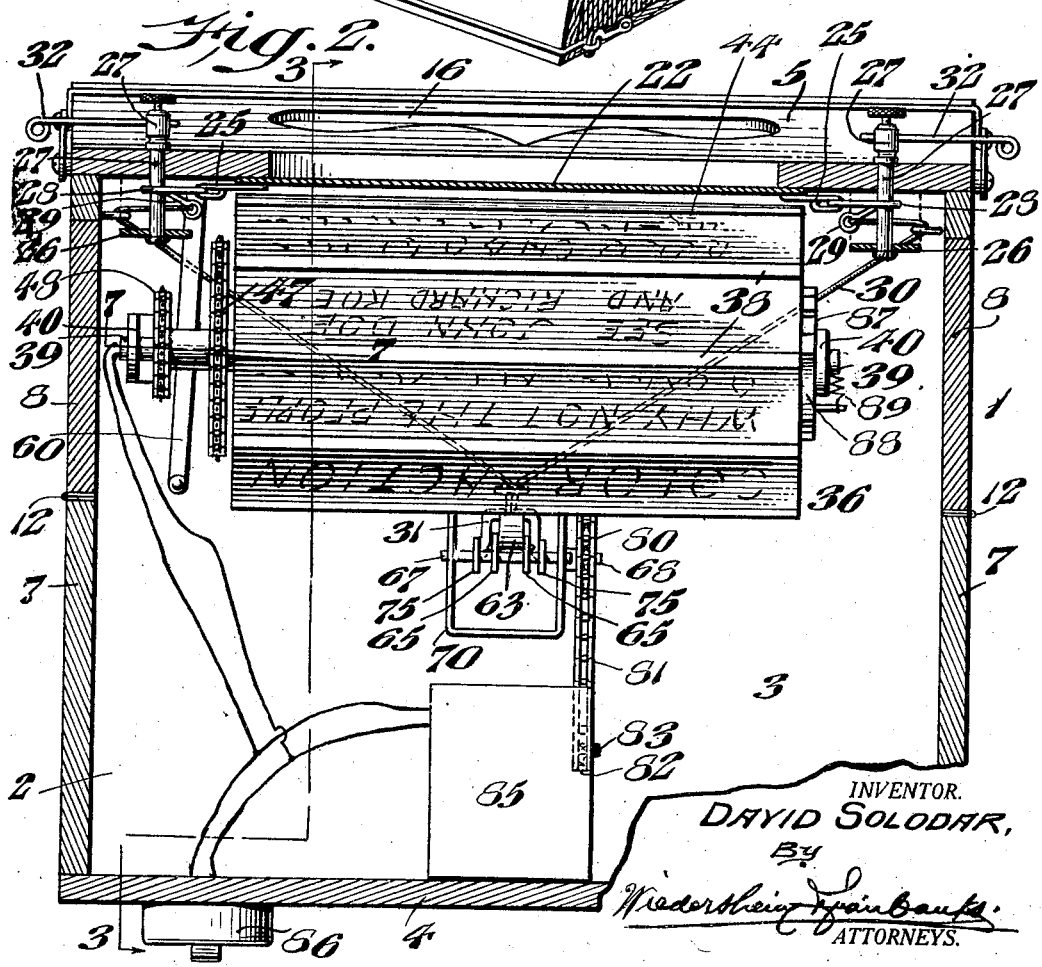
INVENTOR.
DAVID SOLODAR,
ATTORNEYS.

June 24, 1930.  D. SOLODAR  1,767,712
ADVERTISING DEVICE
Filed March 28, 1929   5 Sheets-Sheet 2

INVENTOR.
DAVID SOLODAR
BY
ATTORNEYS.

June 24, 1930.  D. SOLODAR  1,767,712
ADVERTISING DEVICE
Filed March 28, 1929  5 Sheets-Sheet 3

INVENTOR.
DAVID SOLODAR,
BY
ATTORNEYS.

June 24, 1930.                D. SOLODAR                    1,767,712
                         ADVERTISING DEVICE
                       Filed March 28, 1929         5 Sheets-Sheet 4
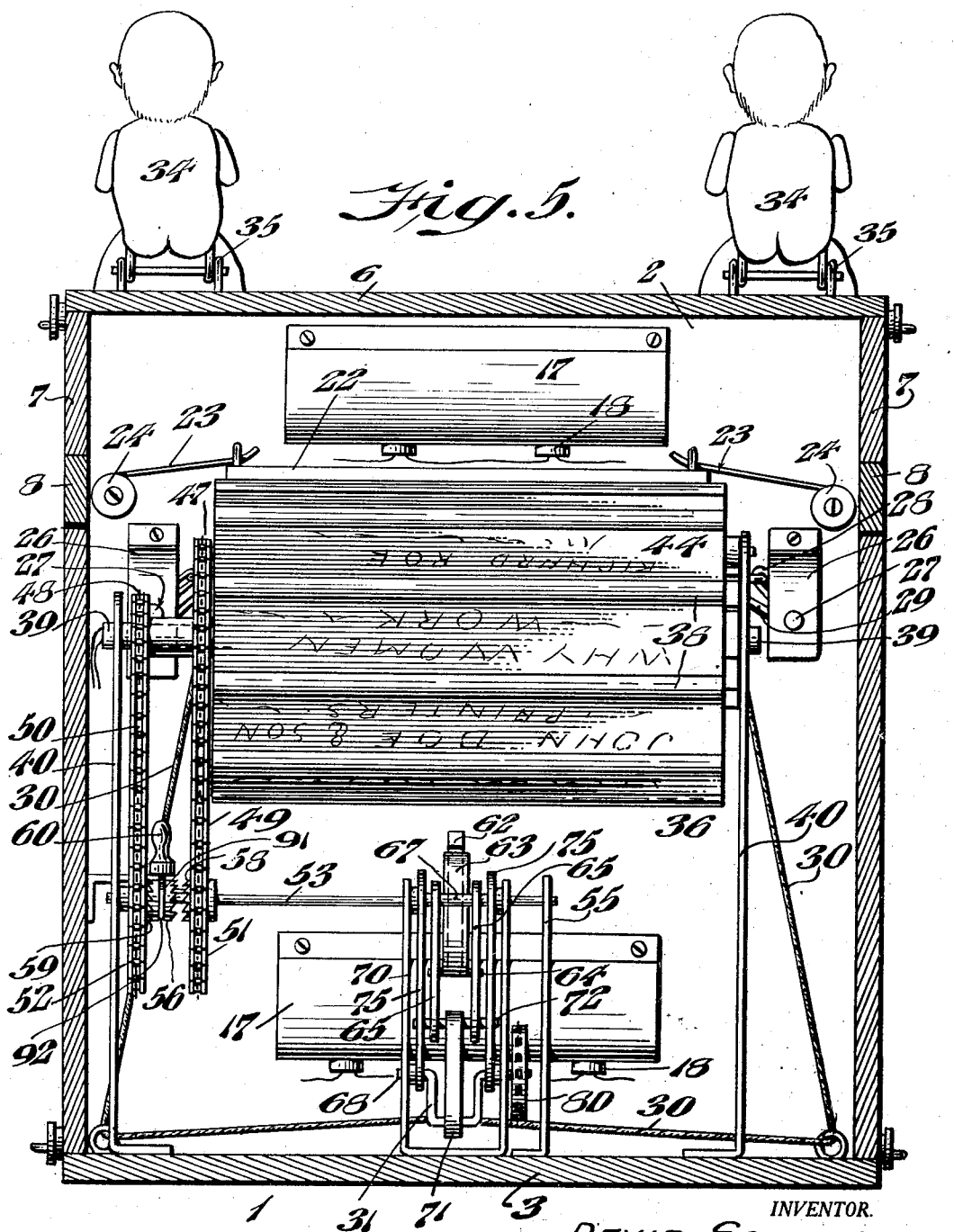
INVENTOR.
DAVID SOLODAR,
BY
ATTORNEYS.

June 24, 1930.  D. SOLODAR  1,767,712
ADVERTISING DEVICE
Filed March 28, 1929   5 Sheets-Sheet 5
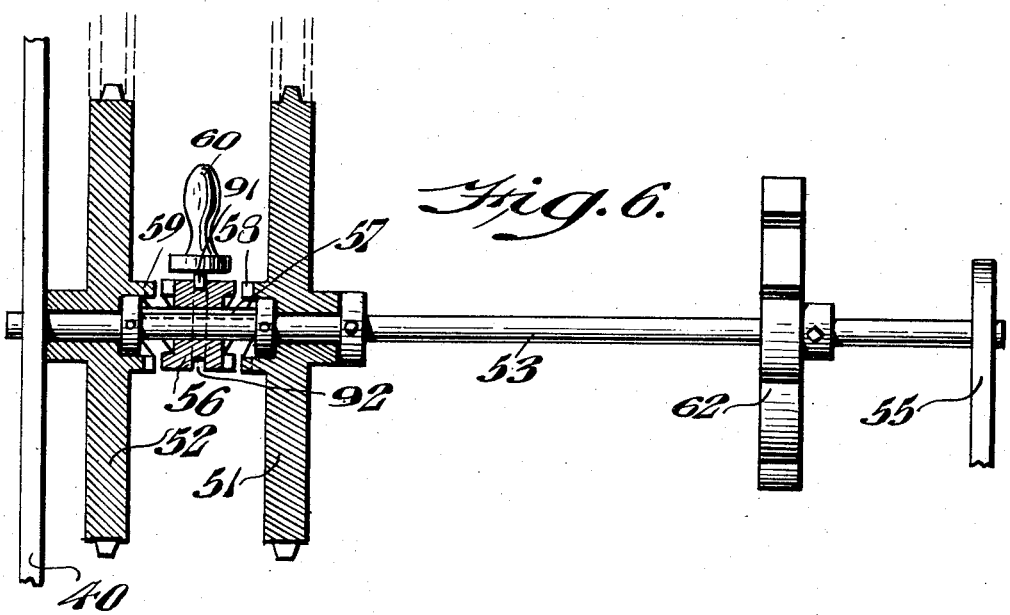
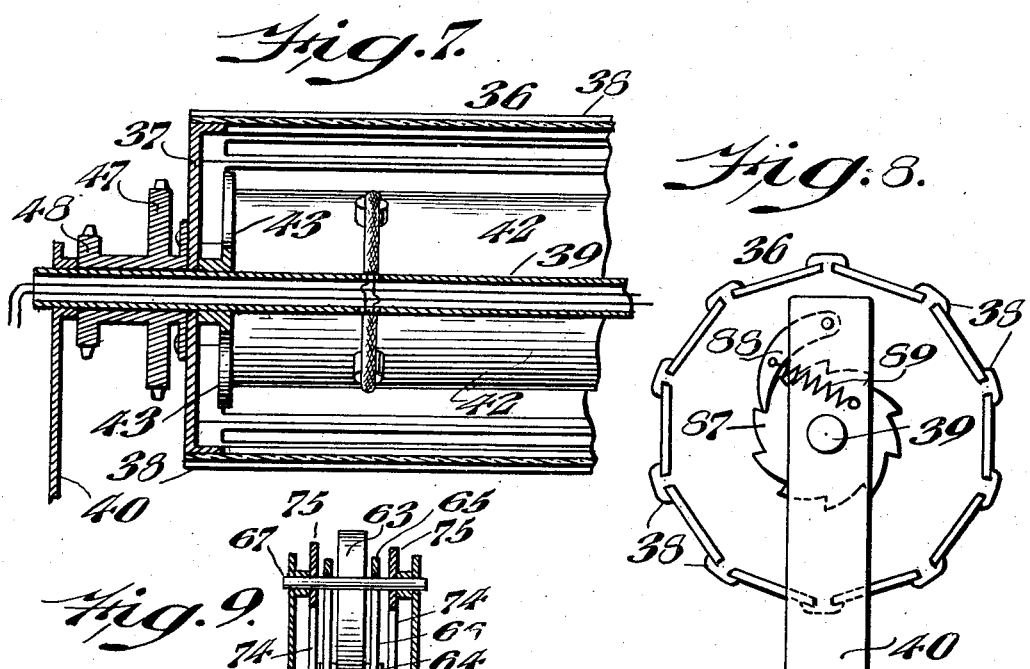
INVENTOR.
DAVID SOLODAR,
BY
ATTORNEYS.

Patented June 24, 1930

1,767,712

UNITED STATES PATENT OFFICE

DAVID SOLODAR, OF EPHRATA, PENNSYLVANIA

ADVERTISING DEVICE

Application filed March 28, 1929. Serial No. 350,512.

My invention relates to a new and useful advertising device and more particularly, to an electrically operated and illuminated advertising device adapted for the successive display of various legends, scenes or other desired literature or inscription.

My invention further relates to a device of this general character wherein the various advertising legends may be displayed one or more at a time successively or in alternating order at will.

My invention further relates to an advertising device of a novel and attractive construction which will effectively draw attention to the advertising matter displayed.

My invention further relates to an advertising device of this character which is equally adapted for daylight or night time use and which, when set or adjusted, will need no further attention.

To the above ends my invention consists of a casing, a revoluble polygonal drum carried by said casing, transparent plates or slides carried by said drum, a source of light within said drum, means for intermittently revolving said drum through a pre-determined distance, there being an adjustable opening in the wall of said casing registering with a portion of said drum, and a shutter, operated by said drum revolving means in synchronism with said drum, for intermittently closing said opening.

My invention further consists of various other novel features of construction and advantage all as hereinafter described and claimed.

In the accompanying drawings:—

Figure 1, represents a perspective view of an advertising device embodying my invention.

Figure 2, represents a horizontal sectional view on line 2—2 of Figure 3, viewed in the direction of the arrows.

Figure 5, represents a vertical sectional view on line 5—5 of Figure 3.

Figure 6, represents, on an enlarged scale, a view partly in section and partly in elevation showing details of the clutch mechanism for regulating the speed of operation shown in the left hand portion of Figure 5.

Figure 7, represents a horizontal sectional view on line 7—7 of Figure 2, certain parts being shown in elevation.

Figure 8, represents an end elevation showing details of construction for preventing backward revolution of the drum shown in Figures 2, 3 and 5.

Figure 9, represents a vertical sectional view on line 9—9 of Figure 3.

Figure 3:
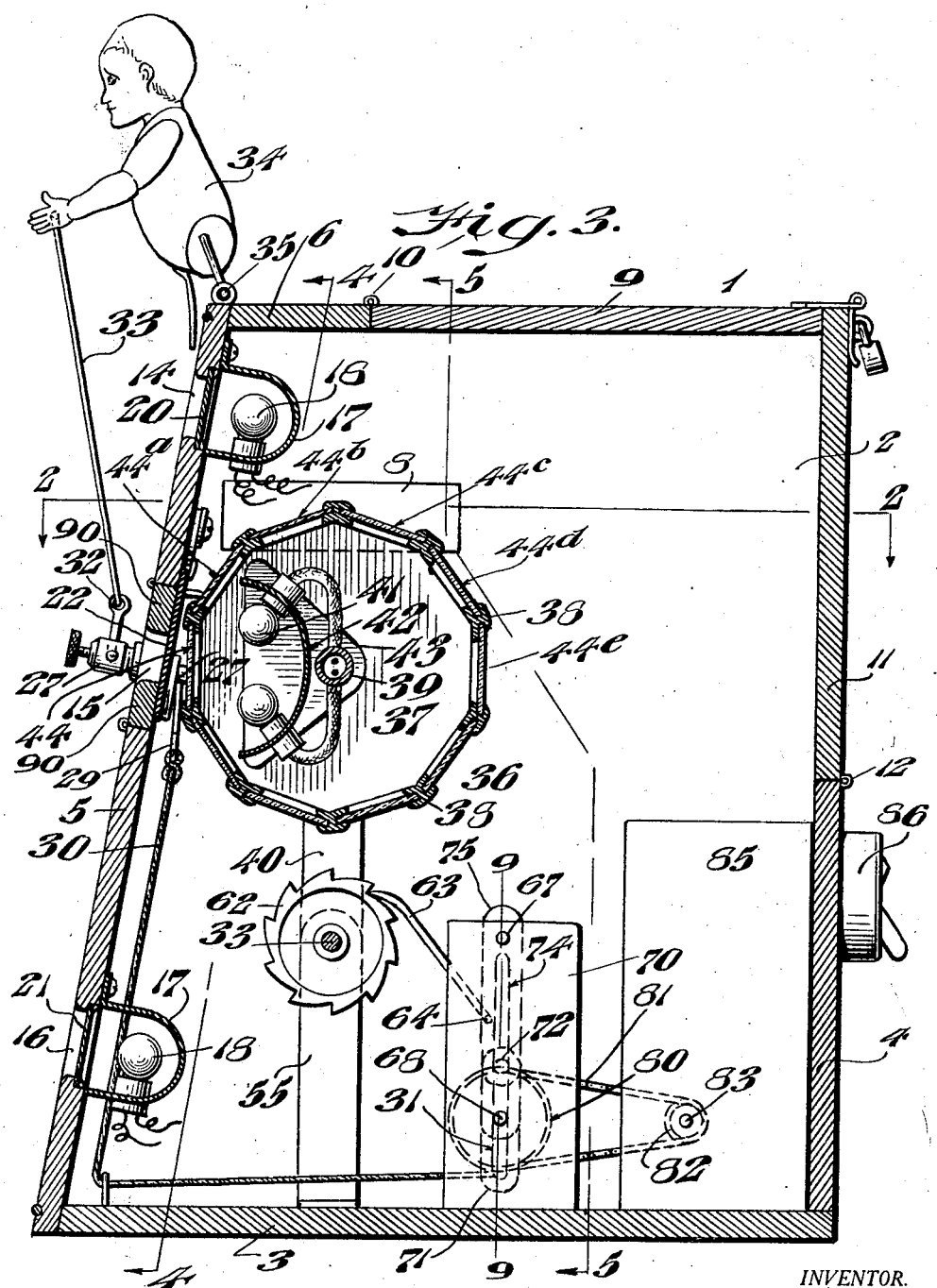
Figure 3, represents a vertical sectional view on line 3—3 of Figure 2, viewed in the direction of the arrows.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts, 1 designates my novel advertising device, comprising a casing 2 composed of the bottom 3, rear wall 4, front wall 5, top wall 6, and the side walls 7. The top wall 6 is provided with the door 9 hinged at 10 while the side walls 7 and the rear wall 4 are provided with the doors 8 and 11 respectively, said doors being hinged at 12 and affording access to the interior of said casing.

The front wall 5 is provided with the upper opening 14, the central opening 15, and the lower opening 16. The upper opening 14 and the lower opening 16 are provided with the inner elongated reflectors 17, housing the lights 18, which serve to illuminate the inscriptions or legends carried by the stationary slides 20 and 21 best seen in Figures 1 and 3. 22 designates a shutter carried by the springs 23 anchored at either side of the casing 2 at 24, and which is normally maintained out of registration with the central opening 15, as shown in dotted lines in Figure 4. The bottom of the shutter 22 is provided with the hooks 25 which are engaged by the rocker arms 28, fast on the shafts 27, journalled in the brackets 26. The shafts 27 also carry fast the rocker arms 29 to which are secured the ends of the flexible connections 30 the other ends of which are connected to the crank shaft 31 hereinafter described.

The shafts 27 project through the front wall 5 of the casing 2, and carry fast thereon the rocker arms 32 which engage the lower ends of the links 33, the upper ends of which engage the figures 34 pivoted to the top 6 of the casing 2, at 35. 36 designates a drum composed of the heads 37 secured to the outer ends of the longitudinally grooved bars 38, and loosely mounted on the fixed tubular shaft 39, which is journalled in the upper ends of the uprights 40. Within the drum 36 are the lights 41 disposed within the reflector 42 which is carried by the end brackets 43 fast on the shaft 39, said lights and reflector registering with the central opening 15. The wires leading to the lights 40 extend or pass through the tubular shaft 39 as will be seen from Figure 2. The outer surface of the drum 36 is composed of the detachable, transparent, slides or plates 44, 44$^a$, 44$^b$, 44$^c$, 44$^d$, 44$^e$, etc., which are slidably supported in the grooved bars 38, said slides being adapted to carry any suitable inscriptions 46. The drum 36 carries fast at one end thereof, the sprocket wheels 47 and 48 over which pass the sprocket chains 49 and 50 which also pass over the sprocket wheels 51 and 52 loose on one end of the shaft 53 the other end of which is journalled in the supporting bracket 55 suitably secured to the bottom 3 of the casing 2. The sprocket wheels 47 and 48 carried by the drum 36 are loosely mounted on, and revoluble with respect to the fixed shaft 39.

56 designates a toothed clutch slidably mounted on the shafts 53 and keyed thereto at 57 said clutch being adapted to engage the toothed hubs 58 and 59 of the sprocket wheels 51 and 52 to actuate one or the other of said sprocket wheels said clutch being actuated by the operating handle 60 hereinafter further described. The shaft 53 also has fast thereon the ratchet wheel 62, which is adapted to be engaged and rotated by the pawl 63 which is carried by the transverse pin 64, the outer ends of which are rigidly secured to the inner links 65, which are provided with the guide slots 66 through which extends the stationary rod 67, the outer ends of which are secured in the upper ends of the supporting U-shaped bracket 70, suitably secured to the bottom 3 of the casing 2.

The crank shaft 31 carries the link 71 to the upper end of which is secured the transverse pin 72 which is rigidly secured to the lower ends of the links 65 (which carry the above mentioned pawl 63) and the outer ends of which are guided in the slots 74 of the outer guide links 75, the upper ends of which firmly engage the rod 67. The lower ends of the outer guide links 75 and the walls of the U-shaped bracket 70 form bearings for the ends 68 of the crank shaft 31 as will be seen from Figure 9. When the crank shaft 31 is revolved the link 71 is raised, thereby raising the transverse pin 72 which carries the links 65 and the outer ends of which are guided in the slots 74 of the links 75. By raising the pin 72 and the links 65 carried thereby, the pawl 63, carried by said links is raised to engage and rotate the ratchet wheel 62 one notch for each revolution of the crank shaft 31. The slots 74 in the outer links 75 serve to guide the outer ends of the transverse pin 72 carrying the links 65, while the slots 66 in the inner links 65 permit the latter to slide vertically on the fixed rod 67, for raising and lowering the pawl 63 by the revolution of the crank shaft 31, as will be understood from Figures 3, 5 and 9.

Figure 4:
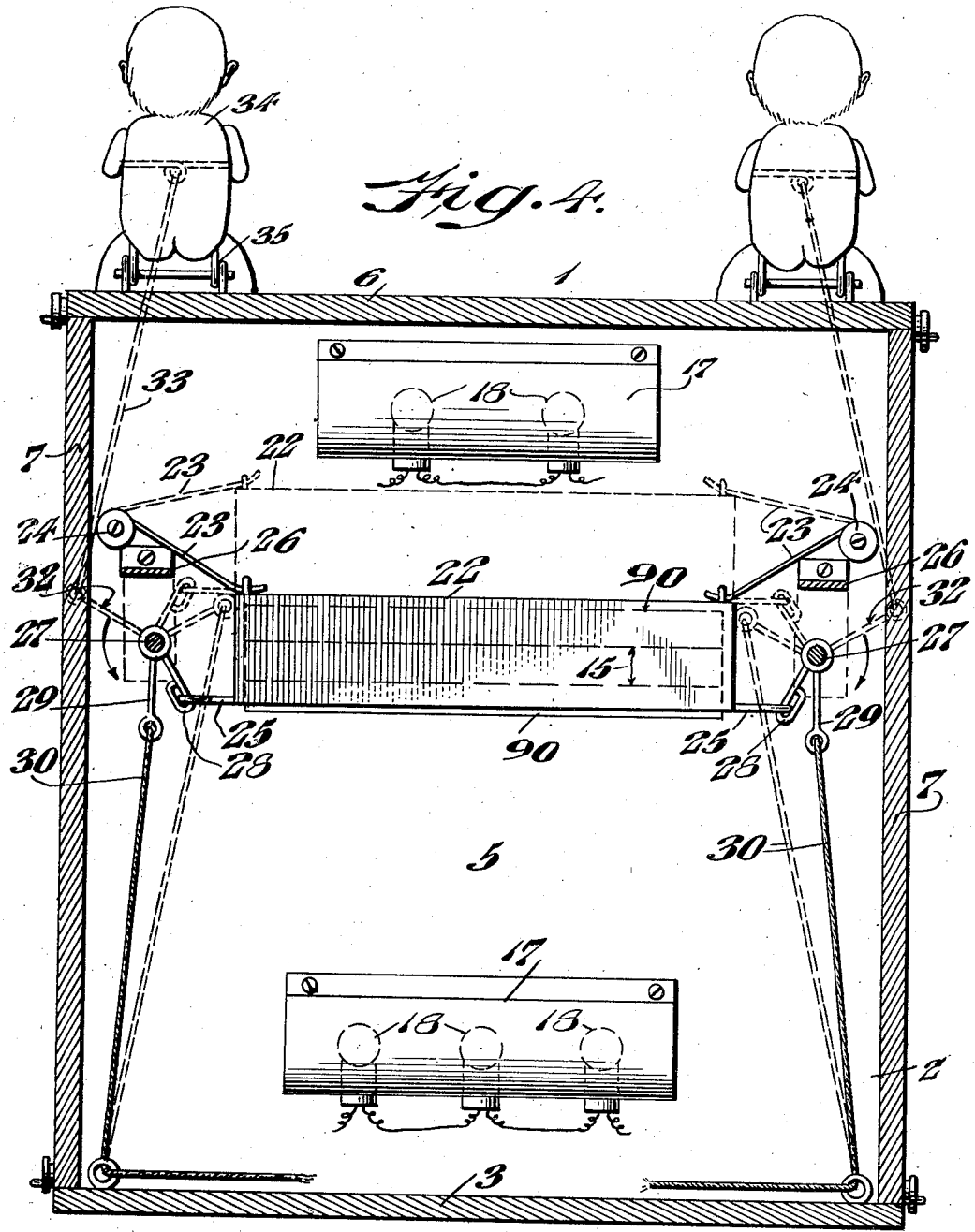
Figure 4, represents a vertical sectional view on line 4—4 of Figure 3.

As will be understood from Figures 3, 4 and 5, the flexible connections or cords 30 are connected to the shutter 22 and to the crank shaft 31, so that with every revolution of the latter a tug or pull is exerted on the rocker arms 29 carried by the shafts 27 on either side of the drum 36, to pull the rocker arms 28 and 29, and hence the shutter 22 from the upper position shown in dotted lines to the lower position shown in full lines in Figure 4. When the shutter 22 is in the upper position, it is out of alignment or registration with the central opening 15, thus leaving the writing or legend 46 on the aligning slide 44 of the drum 36 exposed to view. When the drum 36 is being rotated to bring the next slide 44$^a$ into registration with the opening 15 the shutter 22 is simultaneously pulled down to close said opening, the movements of said drum and said shuter being synchronized so that the opening 15 is closed by the shutter 22 only during the revolution of the drum 36. When the drum 36 has become stationary the tension on the cords 30 is relieved the shutter 22 is raised out of registration with the opening 15 to expose the slide 44$^a$ to view. Simultaneously with the actuation of the shutter 22, the figures 34 are made to bow or courtesy by the tilting of the rocker arm 32 fast on the outer end of the shafts 27, which engage the bottom ends of the links 33 the upper ends of which are secured to the figures (or other ornament) 34 thus giving the impression that the figures 34 raise and lower the shutter 22 to expose or obscure the inscription 46 on the particular slide 44 or 44$^a$ of the drum 36, which at that instant happens to register or align with the opening 15.

The crank shaft 31 carries fast the sprockrather than to the foregoing description to indicate the scope of the invention.

Having thus described my invention, what I claim as new and desire to secure by Letters Patent, is:—

1. In a device of the character stated, a casing having an aperture in a wall thereof, a shutter for intermittently closing said aperture, a drum rotatably mounted in said casing in registration with said aperture, means for intermittently rotating said drum, means for simultaneously and synchronously actuating said shutter and said drum and means for varying the speed of rotation of said drum independently of the actuation of said shutter.

2. In a device of the character stated, a casing having an aperture therein, a polygonal drum in said casing, transparent plates carried thereby, a stationary shaft on which said drum is rotatably mounted, illuminating devices supported on said shaft within said drum, a movable shutter operatively interposed between said aperture and said drum, means for actuating said drum and said shutter, and means for varying the speed of rotation of said drum independently of said shutter.

3. In a device of the character stated, a casing having an aperture therein, a polygonal drum in said casing having longitudinally extending grooved bars, transparent longitudinally extending slides carried by and intermediate said grooved bars, illuminating devices supported on said shaft within said drum, a vertically movable shutter operatively interposed intermediate said drum and said aperture, means for actuating said drum and said shutter, and means for varying the speed of rotation of said drum independently of said shutter.

4. In a device of the character stated, a casing having an aperture therein, a polygonal drum in said casing having longitudinally extending grooved bars, transparent longitudinal slides detachably carried by and between said grooved bars, a stationary shaft extending through said casing on which said drum is rotatably mounted, lights fixedly carried by said shaft in registration with said aperture, a shutter operatively interposed between said drum and aperture, means for intermittently rotating said drum means for actuating said shutter in synchronism with said drum to close said aperture during the rotation of said drum, and means for varying the speed of said drum independently of said shutter.

5. In a device of the character stated, a casing having an aperture in a wall thereof, a shutter adapted to coact with said aperture, a polygonal drum rotatably mounted in said casing and having a plurality of transparent faces carrying inscriptions thereon, one of the faces of said drum being in registration with said aperture, means for intermittently rotating said drum to bring the various faces thereof into registration with said aperture one at a time, means for actuating said shutter to close said aperture during the rotation of said drum, said shutter being normally out of alignment with said aperture, and means for varying the speed of rotation of said drum independently of said shutter.

6. In a device of the character stated, a casing having an aperture in a wall thereof, a shutter for said aperture, means for normally retaining said shutter out of alignment with said aperture, a polygonal drum rotatably mounted in said casing having a plurality of faces carrying various inscriptions thereon, one of the faces of said drum being in registration with said aperture, means for intermittently rotating said drum to bring the various faces thereof into registration with said aperture one at a time in regular succession and means for simultaneously and synchronously actuating said shutter to close said aperture during the rotation of said drum, and means for varying the speed of rotation of said drum independently of said shutter.

7. In a device of the character stated, a casing having an aperture in a wall thereof, a shutter adapted to coact with said aperture, a polygonal drum rotatably mounted in said casing having a plurality of inscribed transparent faces, means for intermittently rotating said drum to bring a plurality of the various faces thereof into registration with said aperture, means simultaneously and synchronously actuating said shutter to close said aperture during the rotation of said drum and to raise said shutter after said drum has become stationary, and means for varying the speed of rotation of said drum independently of said shutter.

8. In a device of the character stated, a casing having an aperture in a wall thereof, said aperture being adjustable, a drum revolubly mounted within said casing in registration with said adjustable aperture, a shutter coacting with and operatively interposed between said drum and said adjustable aperture means for intermittently actuating said shutter and said drum, and means for varying the distance through which said drum is revolved for each stroke of said shutter.

9. In a device of the character stated, a casing having a central aperture in the front wall thereof, means for enlarging or reducing said central aperture, a drum revolubly mounted within said casing in registration with said central aperture, means for intermittently rotating said drum, a shutter operatively interposed between said drum and said central aperture means for actuating said shutter to close said central aperture et wheel 80 over which passes the sprocket chain 81 which also passes over the pinion 82 fast on the shaft 83 which is driven by the conventional electric motor 85, which is supplied with electrical energy through the switch 86, said electrical motor having a variable speed if so desired. The drum 36 carries fast on the end thereof opposite to the end carrying the sprocket wheels 47 and 48, the ratchet wheel 87 which is engaged by the pawl 88 pressed by the spring 69 to prevent the backward rotation of said drum.

The closures 90 are hinged to the front wall 5 of the casing 2, and are adapted to be either entirely removed or to be opened outwardly to enlarge the central opening 15 when and if desired.

The operating handle 60 which actuates the clutch 56 is pivoted at its inner end to a suitable point or support within the casing 2 and is provided with a fork 91 of any conventional type which rides on and engages the annular grooves 92 in the clutch 56, whereby the latter may be moved longitudinally of the shaft 53, by means of the handle 60, without any interference with its freedom of rotation on said shaft.

By the provision of the small sprocket wheel 48, which is about one half the size of the large sprocket wheel 47, I am enabled to vary the speed of rotation of the drum 36 to vary the effective operation of the device. Thus, if the legend 46 is one which occupies but a single slide 44, the clutch 56 is moved to the right hand side to engage the sprocket wheel 51, connected by the chain 49 to the upper large sprocket wheel 47. This revolves the drum 36 at a relatively low rate of speed, and for each stroke of the shutter 22, the drum 36 revolves through an arc equal to the width of one of the slides 44, 44ª, etc., so that one of said slides is displayed at a time through the opening 15, when the shutter 22 has been raised after the drum 36 has again become stationary. If on the other hand the legend 46 occupies two slides 44, 44ª, 44ᵇ, etc., it becomes necessary to expose two of said slides at a time through the opening 15. In order to do this, the closures 90 are removed or opened to enlarge the opening 15, and the clutch 56 is moved to the left hand side to engage the sprocket wheel 52 which is connected by the chain 50 to the small sprocket wheel 48. In this position of the clutch 56, the drum 36 rotates through an arc equal to the width of two of the slides 44ª, 44ᵇ, 44ᶜ, 44ᵈ, etc., for each stroke of the shutter 2 and the slides 44ª, 44ᵇ, 44ᶜ, etc., are displayed through the opening 15 in pairs, or two at a time, when said shutter is raised after the drum 36 has become stationary.

It is to be understood that while I have illustrated and described means for rotating the drum 36 at two speeds to present one of the slides 44 to the central opening 15 at a time with each stroke of the shutter 22, or to present two of the slides 44 and 44ª to the central opening 15 at one time, it is within the scope of my invention to employ other means further to regulate the speed of rotation of the drum 36 with respect to the actuation of the shutter 22.

It is further to be noted, that while I have shown the proportion of the sprocket wheels 47 and 48 as being one to two it is within the purview of my invention to vary this proportion to meet the various requirements due to any change in the form of the drum 36 or in the number or size of slides carried by the grooved bars 38.

It is further to be noted that while I have described my novel device as being capable of presenting either a single slide 44 or a pair of slides 44 and 44ª at one time to the opening 15 for each stroke of the shutter 22 in regular uninterrupted succession or sequence my novel device is capable of being adjusted for the presentation of the slides 44, 44ª, 44ᵇ, 44ᶜ, etc., in alternating sequence or succession, so that the slides 44, 44ᵇ, 44ᵈ, etc., will be brought into registration with the central opening 15 when the shutter 22 is raised and the drum 36 has become stationary, the slides 44ª, 44ᶜ, and 44ᵉ, etc., being "skipped" or omitted.

The figures 34, illustrated in connection with my novel advertising device, simulate human figures and give the impression of operating the shutter 22, but it is to be understood that any other ornament which will effectively attract attention to the advertisements presented in the various apertures in the front wall 5 of the casing 2 may be employed.

It will thus be seen that I have devised a novel advertising device which is clearly visible in the day time and which is effectively illuminated for use at night. The novel advertising device of my construction is further operated by a single mechanism which in addition to varying and regulating the speed of rotation of the drum 36 simultaneously operates the shutter 22 in synchronism with said drum at the same constant speed independently of the speed of said drum.

As heretofore pointed out this construction enables me to present to or display through the central aperture 15, one or more of the slides 44, 44ª, 44ᵇ, 44ᶜ, etc., and to present said slides in alternating or irregular succession if so desired.

I am aware that the invention may be embodied in other specific forms without departing from the spirit or essential attributes thereof, and I therefore desire the present embodiment to be considered in all respects as illustrative and not restrictive, reference being had to the appended claims during the rotation of said drum, and means for regulating the distance through which said drum is rotated for each stroke of said shutter.

10. In a device of the character stated, a casing having an aperture in a wall thereof, a drum rotatably mounted within said casing in registration with said aperture, a shutter adapted to co-act with the aperture registering with said drum, means for simultaneously and synchronously actuating said drum and said shutter, and means for varying the speed of rotation of said drum independently of the actuation of said shutter.

11. In a device of the character stated, a casing having a display aperture therein, a shutter for said aperture, a drum rotatably mounted within said casing in registration with said display aperture, a plurality of inscribed transparent slides carried by said drum, stationary lights within said drum for illuminating said slides, means for raising and lowering said shutter, and means for rotating said drum independently of said shutter to bring the various slides thereon into registration with said central aperture when said shutter is in its raised position.

12. In a device of the character stated, a casing having a central aperture therein, a drum rotatably mounted within said casing in registration with said central aperture, a plurality of inscribed transparent slides carried by said drum, stationary lights within said drum for illuminating said slides, means for rotating said drum to bring the various slides thereon into registration with the juxtaposed aperture, a shutter operatively interposed between said drum and said central aperture to close the latter during the rotation of said drum, means for raising and lowering said shutter, and means for varying the speed of said drum independently of said shutter.

DAVID SOLODAR.